United States Patent [19]

Ozaki et al.

[11] Patent Number: 5,438,424
[45] Date of Patent: Aug. 1, 1995

[54] VIDEO SIGNAL PROCESSING APPARATUS WITH IMAGE QUALITY ADJUSTMENT

[75] Inventors: Yukihiko Ozaki; Eiji Moro, both of Ibaraki, Japan

[73] Assignee: Hitachi, Ltd., Tokyo, Japan

[21] Appl. No.: 89,401

[22] Filed: Jul. 8, 1993

Related U.S. Application Data

[63] Continuation of Ser. No. 826,621, Jan. 28, 1992, abandoned.

[30] Foreign Application Priority Data

Jan. 31, 1991 [JP] Japan ................... 3-010563
Feb. 15, 1991 [JP] Japan ................... 3-021805

[51] Int. Cl.$^6$ .................................. H04N 5/94
[52] U.S. Cl. ......................... 358/336; 358/340
[58] Field of Search ............... 358/162, 168, 166, 174, 358/160, 340, 336, 321, 328, 338; 360/77.12, 77.13, 77.16, 77.17; 348/571, 606, 607, 627, 608, 687

[56] References Cited

U.S. PATENT DOCUMENTS

| | | | |
|---|---|---|---|
| 4,504,863 | 3/1985 | LaCoste | 358/167 |
| 4,587,561 | 5/1986 | Kudo | 358/167 |
| 4,768,094 | 8/1988 | Ichinoi | 358/167 |
| 4,796,088 | 1/1989 | Nishimura et al. | 358/167 |

*Primary Examiner*—Jeffery Brier
*Assistant Examiner*—Robert Chevalier
*Attorney, Agent, or Firm*—Fay, Sharpe, Beall, Fagan, Minnich & McKee

[57] ABSTRACT

A video signal processor includes an image quality adjusting device or noise canceling device which responds to at least one noise information item containing a video signal and, preferably, the noise information item and a brightness information item contained in the video signal, to control quality of a displayed video image to provide a high quality video image.

2 Claims, 15 Drawing Sheets

VIDEO SIGNAL PROCESSING APPARATUS WITH IMAGE QUALITY ADJUSTMENT

This is a continuation of application Ser. No. 07/826,621, filed Jan. 28, 1992, now abandoned.

BACKGROUND OF THE INVENTION

The present invention relates to a video signal processing apparatus and, particularly, to a video signal processing apparatus having an image quality adjusting means for automatically regulating an image quality and is suitable to be applied to a video tape recorder (referred to as VTR hereinafter).

A home VTR is well known as disclosed in "Video Technology Handbook", edited by monthly journal, "Audio Video", Editing Division, pages 73 to 87, which will be described in brief with reference to FIGS. 21 and 22. In the following description, the VTR is of VHS system corresponding to NTSC signal for convenience.

FIG. 21 is a block circuit diagram of an example of a conventional reproduction system of a home VTR. In FIG. 21, an FM luminance signal and a low frequency color signal recorded on a magnetic tape 1 are detected by a magnetic head 2 and, after being amplified by a reproduction amplifier 3, supplied to a low pass filter (LPF) 4 and a high pass filter (HPF) 7. Only the low frequency color signal which is spread with a center frequency of 629 kHz passes selectively through the LPF 4 and, after being converted by a frequency converter 5 into a high frequency color signal having center frequency of 3.58 MHz and passed through a band pass filter (BPF) 6, supplied to an input of an adder 11. On the other hand, only the FM luminance signal whose carrier frequency is set to 3.4 MHz to 4.4 MHz passes selectively through the HPF 7 and, after being demodulated by an FM demodulator 8 to a video luminance signal and passed through a LPF 9, supplied to an image quality adjusting circuit 10. The image quality adjusting circuit 10 has a function of reducing noise of a reproduced image or emphasizing contour information thereof by changing gain vs. frequency characteristics thereof for an input signal. An output of the image quality adjusting circuit 10 is supplied to another input of the adder 11 and added to the high frequency color signal, resulting in a reproduced video signal at a terminal 12. Therefore usually characteristics of the image quality adjusting circuit 10 therefore are changed by a voltage control. Therefor conventionally the characteristics of the image quality adjusting circuit therefore are changed manually by means of a switch or a volume provided on a front portion of the VTR for making the control voltage variable.

FIG. 22 is a block circuit diagram of an example of a conventional recording system of a home VTR. In FIG. 22, a video signal supplied to an input terminal 36 is supplied to a BPF 37, a LPF 40 and a terminal 47. The terminal 47 is an EE output terminal for monitoring the input signal and the inputted video signal appears at the EE terminal 47 substantially as it is. A high frequency color signal of the input video signal, which is centered at 3.58 MHz, passes selectively through the BPF 37 and, after being converted by a frequency converter 38 into a low frequency color signal and passed through a LPF 39, is supplied to a recording amplifier 43. On the other hand, a video luminance signal passes selectively through the LPF 40 and, after being modulated to an FM luminance signal by means of an FM modulator 41 and passed through a HPF 42, is supplied to the recording amplifier 43. In the recording amplifier 43, the FM luminance signal and the low frequency chroma signal are mixed, suitably amplified and recorded on a magnetic tape 45 through a magnetic head 44. As is clear from the above description, there is no automatic image quality adjusting mechanism for the EE output signal and the recording signal provided in the conventional apparatus.

In the conventional technique mentioned above, image quality adjusting for the reproduced signal is performed manually. Therefore, in order to enjoy good image quality continuously, it is necessary to make optimum adjustments every time the reproducing tape is changed, according to a variation of signal to noise (S/N) ratio due to degradation of magnetic tape. Further, even during a continuous reproduction of a same tape, optimum image quality adjustment changes every scene since noticeability of noise varies with change of brightness of the reproduced image. It is very difficult to finely adjust the image quality manually in response to such variation. Further, since there is no automatic image quality adjusting means provided for the recording signal and the EE signal, it is impossible to adjust the image quality according to brightness of an image and/or S/N ratio of the input signal.

FIG. 23 shows another conventional reproduction system; shown in pages 76–87 of the aforementioned article. The conventional system in FIG. 23 differs from that shown in FIG. 21 in that the image quality regulation means takes in form of a noise canceller 18 and that it further includes an auto tracking system including an FM signal amplitude detector 22, an auto tracking micro computer 24, a system control micro computer 25, a capstan servo circuit 26 and a capstan motor 27.

In FIG. 23, an amplitude of the FM signal from the reproducing amplifier 3 is converted into DC voltage information corresponding to the signal amplitude by the FM signal amplitude detector 22 and supplied to the auto tracking micro computer 24. The auto tracking micro computer 24 determines, on the basis of the DC potential information, an optimum tracking phase so that the amplitude of the reproduced FM signal becomes maximum and sends a result to the system control micro computer 25. The system control micro computer 25 continuously manages the VTR and, when an auto tracking operation is required, for example, immediately after a tape is inserted, sends the information from the auto tracking micro computer 24 to the capstan servo circuit 26 which responds thereto to send a control signal to the capstan motor 27 to automatically control a tape running speed such that the magnetic head 2 correctly traces the recording track pattern recorded on the magnetic tape 1.

As to the noise canceller 18 shown in FIG. 23, it is not always necessary for a home VTR to reproduce a signal with the same fidelity as required for a broadcasting VTR so long as it is visually acceptable. Therefore, the noise canceller 18 having such circuit construction as shown in FIG. 24 has been used conventionally. In FIG. 24, the noise canceller 18 comprises a filter 120 having an input connected to an input terminal 119, an amplifier 121, a limiter 122, a level matching circuit 123, all of which are connected in series in the order, and a subtractor 124 having a minus input connected to an output of the level matching circuit 123, a plus input connected to the input terminal 119 and an output terminal 125. The reproduced video signal from the LPF 9 is supplied through the input terminal 119 to the plus input of the subtractor. 124 and the input of the filter 120. Since the reproduced video signal inputted to the input terminal 119 is obtained by the FM demodulation, high frequency component thereof includes larger noise due to the nature of the so-called triangle noise which is unique for FM processing. In order to remove this noise, a high pass filter is used as the filter 120. The high frequency component passed through the filter 120 is amplified suitably by the amplifier 121 and then amplitude-limited by the limiter 122. The threshold value of the limiter 122 is usually set to a value slightly larger than noise amplitude for a video signal having usual signal to noise ratio. Therefore, in this case, the noise component is supplied to the level matching circuit 123 without amplitude limitation. On the other hand, almost all information of the signal component is lost by means of the amplitude limiting effect of the limiter 122 and therefore the level matching circuit 123 receives almost no signal. The output of the level matching circuit 123 is connected to the minus input of the subtractor 124, as mentioned.

It is possible to change an amount of noise component to be substracted from the video input supplied to the plus input of the subtractor 124 by a level setting of the level matching circuit 123. Although, in the subtractor 124, a small amount of the high frequency signal component is subtracted from the input video signal, a waveform degradation resulting therefrom is as small as allowable for the home VTR.

The level matching circuit 123 may have a circuit construction shown in FIG. 25, which includes a resister 127 connected at one end to an input terminal 134 and at the other end to an output terminal 135 and a series connection of a grounding resister 128 and a capacitor 132.

Assuming that the resister 128 has a value R, the level setting is fixed by the value R thereof.

FIG. 26 shows characteristics curves showing a variation of S/N ratio of luminance signal when R is changed, with the value of R (KΩ) in abscissa and S/N ratio of value of luminance signal in ordinate. A characteristic curve I is obtained when the amplitude of FM signal is 420 mVp-p, a curve II 280 mVp-p and a curve III 200 mVp-p. The reduction of reproduced FM signal amplitude is caused by narrow width of the reproducing magnetic head, tracking deviation during reproduction or demagnetization of the magnetic tape due to-repetitive reproductions. In any case, reproduced FM signal carrier vs. noise ratio is reduced and therefore, S/N ratio of the video signal obtained by demodulation becomes small. In general, the larger the S/N is; the better the reproduction. Among the three curves in FIG. 26, the curve I exhibits the best S/N ratio and the curve III is the worst.

In the case of the curve I, the amount of noise component imposed on the reproduced video signal at the input terminal 19 is small and is not limited by the limiter 22. When R is gradually increased, noise to be subtracted from the input video signal becomes gradually large, enhancing the noise cancelling effect. When the noise included in the reproduced video signal. and the noise amount outputted from the level matching circuit 123 becomes equal, the maximum S/N value is obtained at a point b. In the case of the curve I, it is usual to set the R value to one corresponding to the point b. At a point a on the same curve, the reproducibility of high frequency component of a minute signal whose amplitude is close to that of noise may be better than that at the point b although the S/N ratio is slightly lowered. With R larger than that at the point b, the noise component in reverse phase increases gradually resulting in reduction of S/N ratio since the output of the level matching circuit 123 becomes larger compared with that of the video signal.

In the case of the curve II, the noise component of the reproduced video signal is large and therefore its amplitude of the noise component is limited by the limiter 122. Therefore, in order to coincide the noise amount from the level matching circuit 123 with the noise amount in the reproduced video signal, it is necessary to reduce the attenuation by the R in the level matching circuit 123 compared with the case of the curve I. Therefore, R with which the S/N value becomes maximum becomes larger than that in the case of the curve I.

In the case of the curve III, the above matter concerned to the curve II is further enhanced.

Assuming that the R is initially set to a value corresponding to the point a for reproduction of a signal whose FM signal amplitude is large, the value of the R corresponds to a point c in the curve III for a signal whose FM signal amplitude is small and a resultant S/N ratio of image is visually bad. Therefore, it is preferably to make the R automatically changeable correspondingly to a state of a reproduced signal.

SUMMARY OF THE INVENTION

An object of the present invention is to provide means for automatically adjusting image quality on the basis of at least noise information and preferably a plurality of image information items including S/N ratio and brightness of an image plane of a reproduced signal, a recording signal or an EE signal for monitoring purpose.

The above object is achieved according to the present invention, by providing a circuit for processing at least one and, preferably, a plurality of image information items such as S/N ratio and brightness of image and controlling an image quality adjusting device or noise canceller inserted in a signal path according to an input signal.

Since the image quality is continuously and automatically adjusted on the basis of an existing image information item or items, a user can always easily enjoy good image quality.

DETAILED DESCRIPTION OF THE PREFERRED EMBODIMENTS

An embodiment of the present invention will be described.

Figure 1:
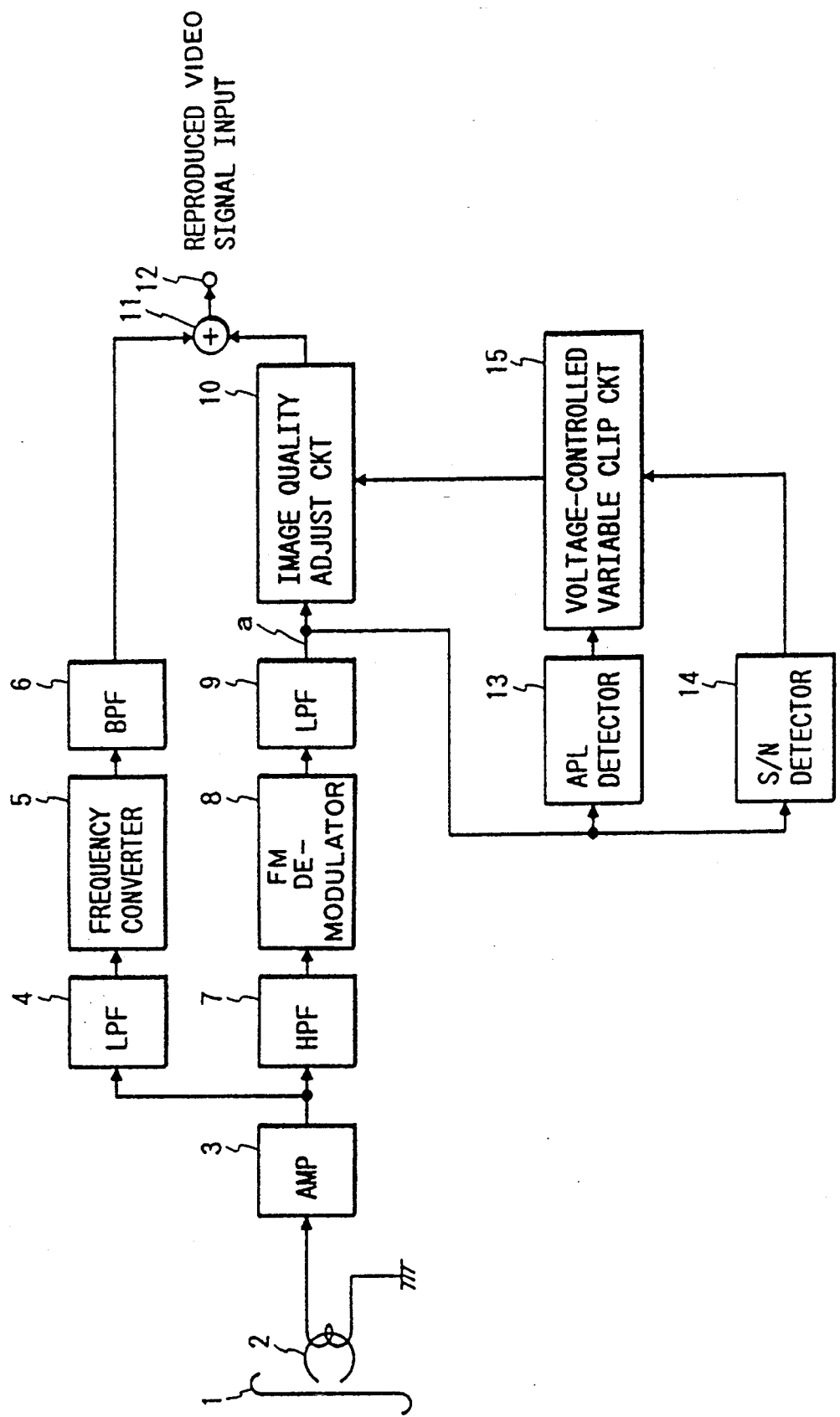
FIG. 1 is a block circuit diagram of an embodiment of the present invention.
Figure 21:
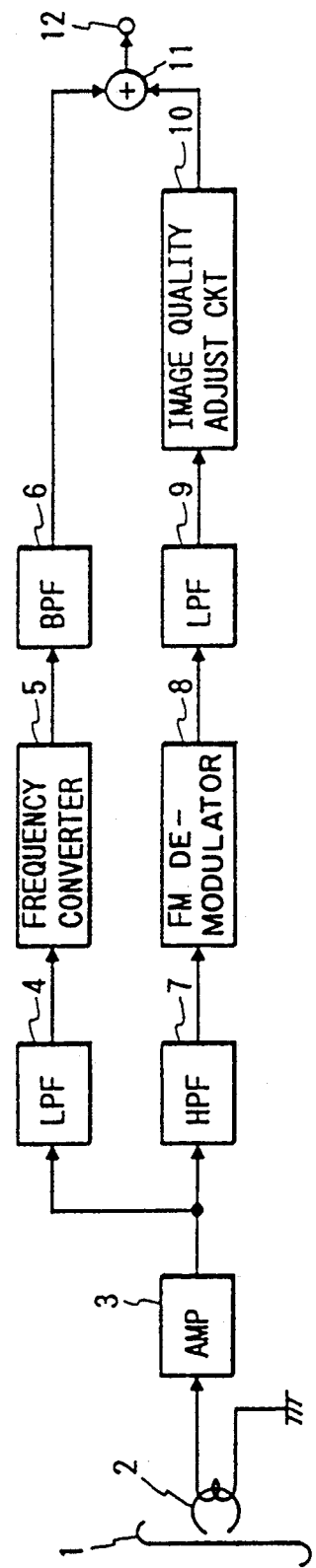
FIG. 21 is a block circuit diagram showing a conventional reproducing system of a home VTR.

FIG. 1 is a block circuit diagram of an example of a system according to an embodiment of the present invention when applied to a reproducing system of a home VTR. In FIG. 1, constructions and operations of a magnetic tape 1, a magnetic head 2, a reproducing amplifier 3, a LPF 4, a frequency converter 5, a BPF 6, a HPF 7, an FM demodulator 8, a LPF 9, an image quality adjusting circuit 10, and adder 11 and a terminal 12 are the same as those shown in FIG. 21..and described previously and, therefore, details thereof are omitted to avoid duplication.

Figure 2:
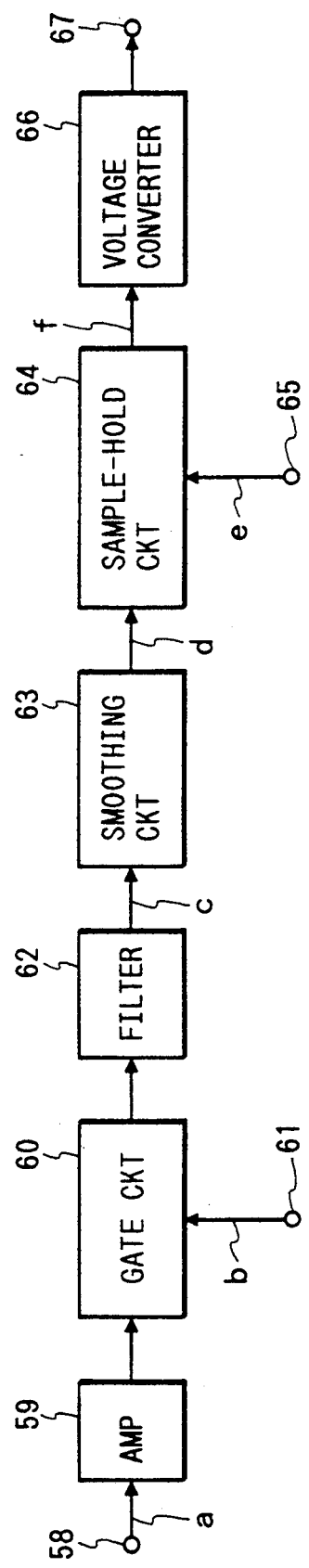
FIG. 2 is a block circuit diagram of an example of an S/N detector of the embodiment shown in FIG. 1.
Figure 5:
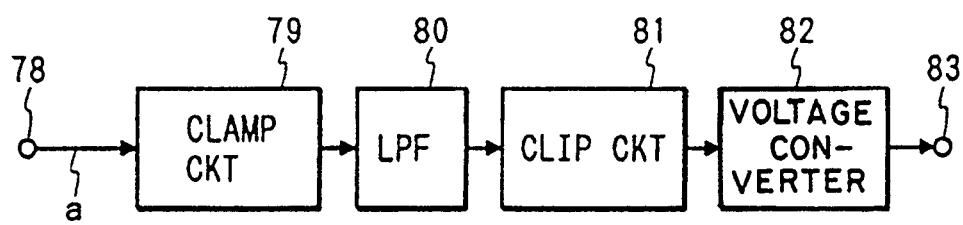
FIG. 5 is a block circuit diagram of an example of an APL detector in FIG. 1.

A luminance signal from the LPF 9 is supplied to an average potential level (APL) detector 13 and a S/N ratio detector 14. FIG. 2 shows a circuit construction of the S/N detector 14 which comprises, in series, an amplifier 59 having an input terminal 58, a gate circuit 60 having a control terminal 61, a filter 62, a smoothing circuit 63, a sample-hold circuit 64 having a control terminal 65 and a voltage converter 66 having an output terminal 67. The APL detector 13 is shown in FIG. 5 and comprises, in series, a clamp circuit 79 having an input terminal 78, a LPF 80, a clip circuit 81 and an amplifier 82 having an output terminal 83. An APL information from the APL detector 13 and an S/N ratio information from the S/N detector 14 are supplied to a voltage-controlled variable clip circuit 15 and, after being processed suitably thereby, controls the image quality adjusting circuit 10.

An operation of the S/N detector 14 will be described with reference to FIG. 2, FIG. 3 which shows waveforms of various signals in FIG. 2 and FIG. 5.

Figure 3:
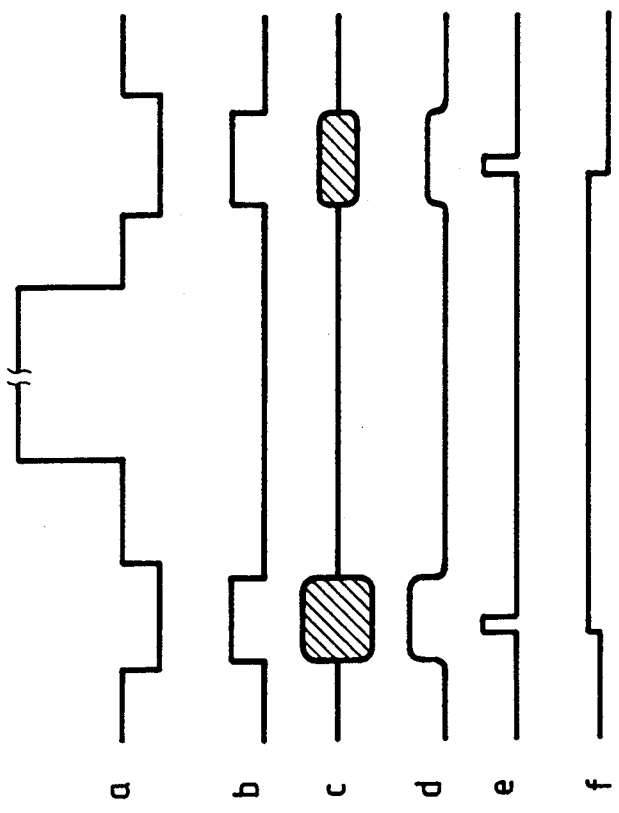
FIG. 3 shows waveforms of signals at various points of the S/N detector in FIG. 2.

In FIGS. 2 and 3, the luminance signal supplied from the LPF 9 and having waveform a is supplied to the input terminal 58 of the S/N detector 14 and, after being amplified by the amplifier 59, supplied to the gate circuit 60. A gate pulse having waveform b is supplied to the terminal 61 of the gate circuit 60. A leading edge of the gate pulse b is slightly delayed from a start position of a horizontal synchronizing period of the video luminance signal a and a trailing edge thereof is preferably slightly before an end of the same period. The gate circuit 60 passes the output signal of the amplifier 59 to the filter 62 for a time period in which the gate pulse b is in high level and blocks it while the gate pulse b is in low level. A pass-band of the filter 62 is selected such that noise component to be detected can be selectively passed therethrough.

Figure 4:
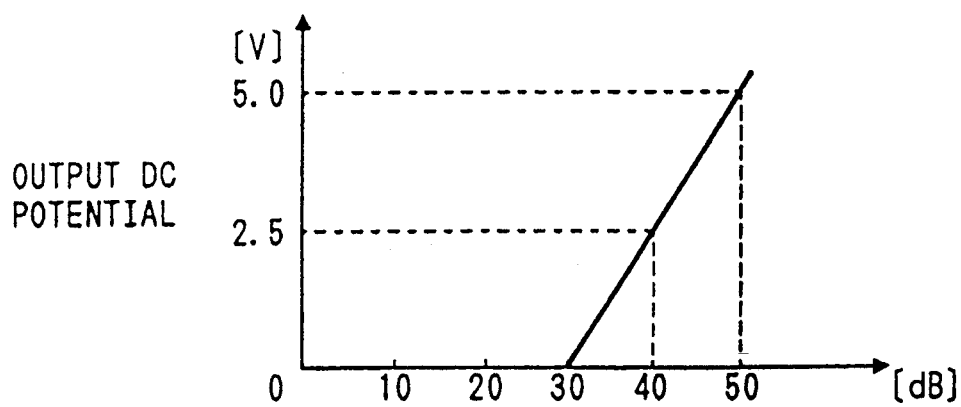
FIG. 4 is a graph showing input/output characteristics of the S/N detector in FIG. 2.

Usually, a HPF or BPF is used as the filter 62. A waveform c is an output of the filter 62, which is smoothened by the smoothing circuit 63 to obtain a waveform d which is supplied to the sample-hold circuit 64. To the terminal 65 of the sample-hold circuit 64, a sample-hold pulse e is supplied. The sample-hold circuit 64 performs a sampling operation during a time in which the sample-hold pulse e is in high level and a holding operation during a time for which the signal e is in low level. As a result, an output of the sample-hold circuit 64 becomes that shown by waveform f which is supplied to the voltage converter 66. A DC potential of the waveform f varies correspondingly to an amount of noise during the horizontal synchronizing period of the luminance signal a, which information is held for one horizontal scanning period and is updated with a next horizontal synchronizing signal period. Further, DC potential of the waveform f is higher when S/N ratio is higher, that is, the larger the amount of noise provides the higher the DC potential of the waveform f. The DC potential is voltage-converted by the voltage converter 66 so that the variation thereof becomes preferable for control of the voltage-controlled variable clip circuit 15 and the voltage-converted output of the converter 66 appears at a terminal 67 connected to the voltage-controlled variable clip circuit 15. An example of the input-output characteristics of the S/N detector 14 is shown in FIG. 4.

Figure 6:
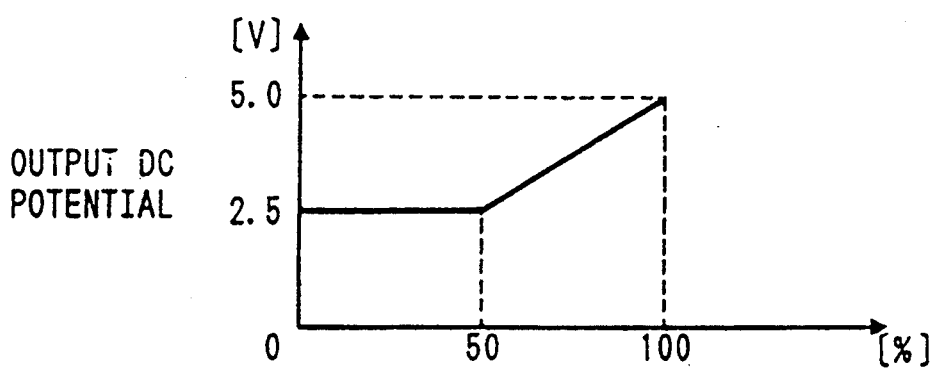
FIG. 6 is input/output characteristics of the APL detector in FIG. 5.

In FIG. 5, the luminance signal a from the LPF 9 is supplied to the input terminal 78 of the APL detector 13 and a DC potential of a leading portion of the synchronizing signal is made constant by the clamp circuit 79, output of which is filtered by the LPF 80 to obtain an average DC potential information which is an average picture level (APL) information. DC potential of the APL information is proportional to the APL. However, since it is clipped by the clip circuit 81 so that it does not become lower than a potential corresponding to 50% of APL, the output DC potential of the clip circuit 81 does not vary when APL is smaller than 50%. The output DC potential of the clip circuit 81 is voltage-converted by the voltage converter 82 so that the voltage variation becomes suitable as an input to the voltage-controlled variable clip circuit 15. The voltage-converted output of the converter 82 appears at the terminal 83. An example of input-output characteristics of the APL detector 13 is shown in FIG. 6.

Figure 7:
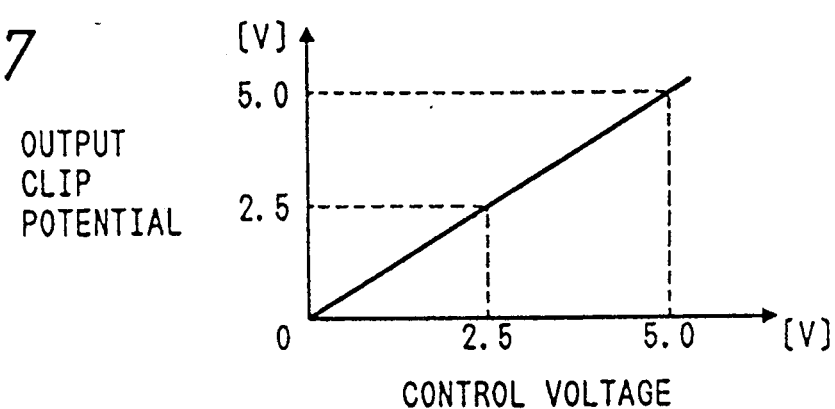
FIG. 7 is input/output characteristics of a voltage-controlled variable clip circuit in FIG. 1.

FIG. 7 shows an example of characteristics of the voltage-controlled variable clip circuit 15. In FIG. 7, control voltage shown as the abscissa is the output DC potential of the S/N detector 14. The output DC potential of the APL detector 13 is limited to the output clip potential as the ordinate.

Figure 8:
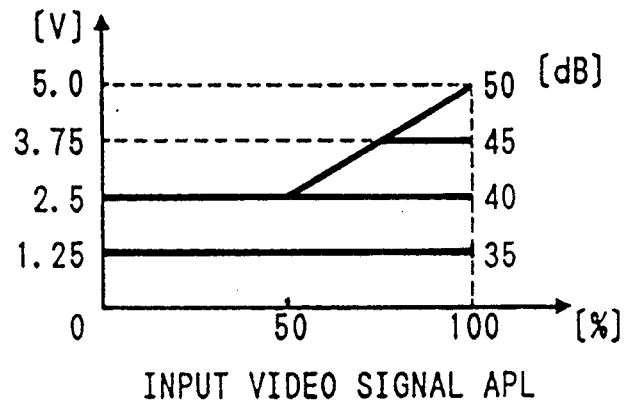
FIG. 8 is a graph showing characteristics of a combination of the APL detector, the S/N detector and the voltage-controlled variable clip circuit in FIG. 1.

FIG. 8 is an example of characteristics of a combination of the APL detector 13, the S/N detector 14 and the voltage-controlled variable clip circuit 15. Comparing with the output potential shown in FIG. 6, it is clear that an upper limit of the output voltage of the clip circuit is restricted due to a variable clipping effect obtained by the output clip potential for video signal luminance S/N as a parameter.

Figure 9:
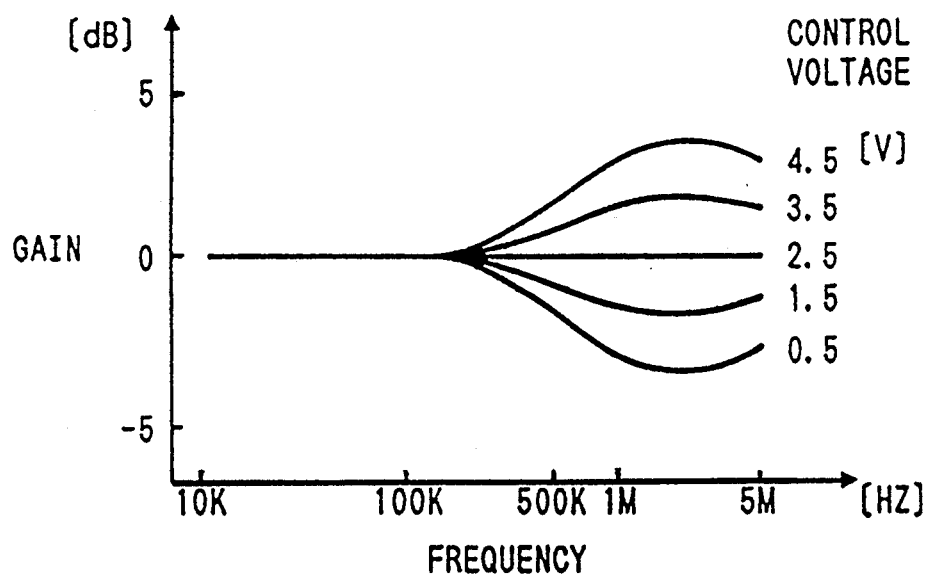
FIG. 9 is a graph showing an example of characteristics of an image quality adjusting circuit in FIG. 1.

FIG. 9 shows an example of characteristics of the image quality adjusting circuit 10. As a minute signal information of an image, a frequency band centered around 2.5 MHz which is easily visible is emphasized or restricted by a control voltage which is the output voltage of the voltage-controlled variable clip circuit 20 shown in FIG. 8. When the input video signal luminance S/N is acceptable, for example, when S/N value is 50 dB, the control voltage of the image quality adjusting circuit 10 is constant at 2.5 v for APL in a range from 0 to 50% and the gain-frequency characteristics of the circuit 10 becomes flat as shown in FIG. 9. For a range of APL from 50 to 100%, the control voltage of the circuit 10 is linearly increased from 2.5 V to 5.0 V with increase of the APL as shown in FIG. 8. Therefore, the minute signal information of an image is gradually emphasized with increase of APL, so that an image whose contour information is emphasized is obtained. When input video signal luminance S/N is bad, e.g., S/N value is 35 dB, the control voltage of the circuit 10 is constant at 1.25 V in APL ranged from 0 to 100%, the minute signal information of image is restricted by the circuit 10 regardless of APL and thus an image whose noise output is restricted is obtained. As is clear from the characteristics shown in FIG. 8, in this embodiment, the control is performed by S/N information rather than APL information. This control is matched to the fact that the noise of image due to variation of S/N value is visually detected more easily than due to variation of APL.

Figure 10:
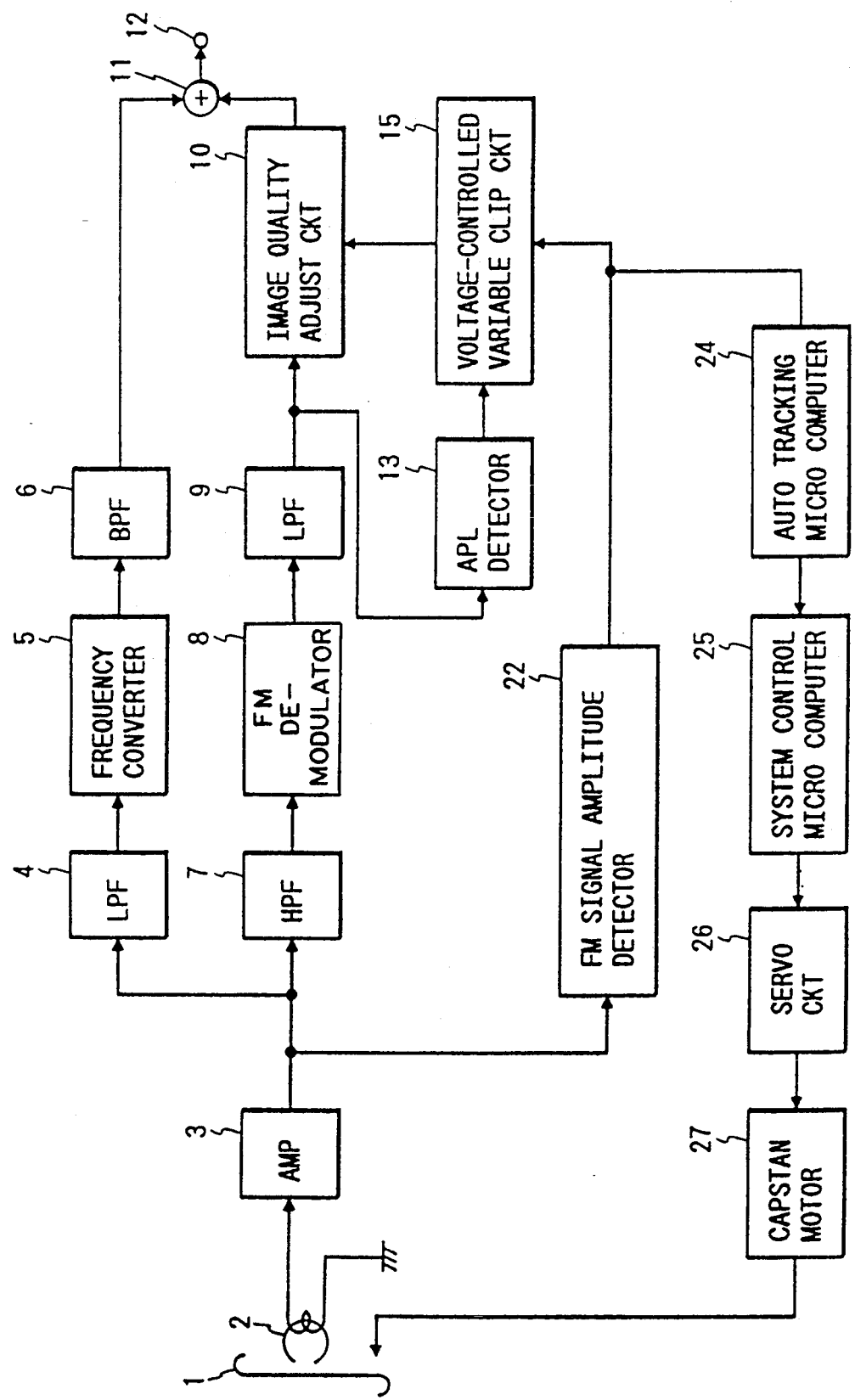
FIG. 10 is a block circuit diagram of a second embodiment of the present invention.

FIG. 10 shows another embodiment of the present invention which is similar to that shown in FIG. 1 except that it further includes an auto tracking function and that, to this end, the S/N detector 14 in FIG. 1 is substituted by an FM amplitude detector 22 having an input connected to the reproducing amplifier 3 and an output connected to an input terminal of the voltage-controlled variable clip circuit 15. The FM signal amplitude detector 22 has a characteristics shown in FIG. 11. The auto tracking function is realized by a series connection of an auto tracking micro computer 24, a system control micro computer 25, a servo circuit 26 and a capstan motor 27.

In detail, the FM amplitude detector 22 converts the output of the reproducing amplifier 3 into DC potential information corresponding to an FM amplitude and the DC potential information is supplied to the auto tracking micro computer 24 as FM amplitude information. The auto tracking micro computer 24 sends an instruction through the system control micro computer 25 and the servo circuit 25 to the capstan motor 27 to control a tape speed so that the magnetic head 2 is relatively matched in position to an optimum tracking position in which FM amplitude becomes maximum.

In a reproducing operation of VTR, degradation of S/N of a reproduced video signal due to degradation of tape magnetization and/or deviation of the head from the tracking position occurs with reduction of FM amplitude. That is, the FM amplitude information from the FM amplitude detector 22 can be used as a substitution for the S/N information. Therefore, it is possible to adjust a variation of image quality caused by the tape demagnetization and/or tracking error by supplying the output of the FM amplitude detector 22 to the control level of the voltage-controlled variable clip circuit 15.

Figure 11:
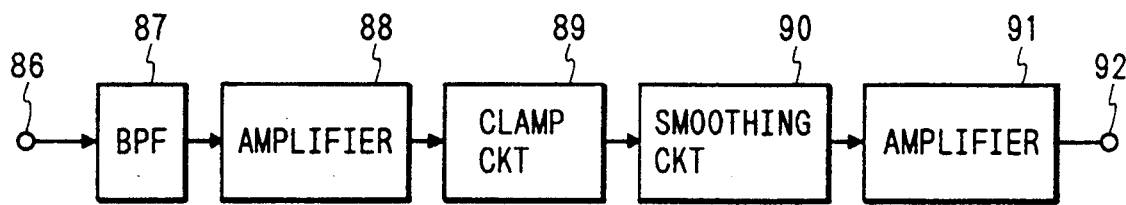
FIG. 11 is a block circuit diagram of an FM signal amplitude detector in FIG. 10.

FIG. 11 shows a circuit construction of the FM signal amplitude detector 12 in FIG. 10. In FIG. 11, it comprises, in series, a BPF 87 having an input terminal 86, an amplifier 88, a clamp circuit 89, a smoothing circuit 90 and an amplifier 91 having an output terminal 92. A frequency band around the FM carrier of the FM signal supplied to the input terminal 86 is removed by the BPF 87 and, after being amplified by the amplifier 88 clamped by the clamping circuit 89 to the lowest DC potential among the signal. Then, it is derived by the smoothing circuit 90 as a DC potential information varying correspondingly to the signal amplitude, which is amplified by the amplifier 91 to a required level.

Figure 12:
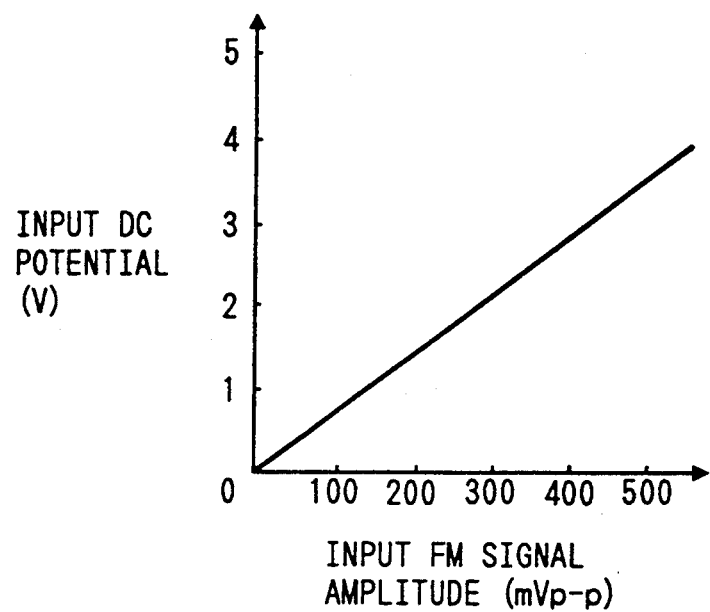
FIG. 12 is a graph showing an example of characteristics of the FM amplitude detector circuit in FIG. 11.

FIG. 12 is a graph showing a characteristics of the FM signal amplitude detector 22. As shown in FIG. 12, the output DC potential is proportional to the input FM signal amplitude.

Figure 13:
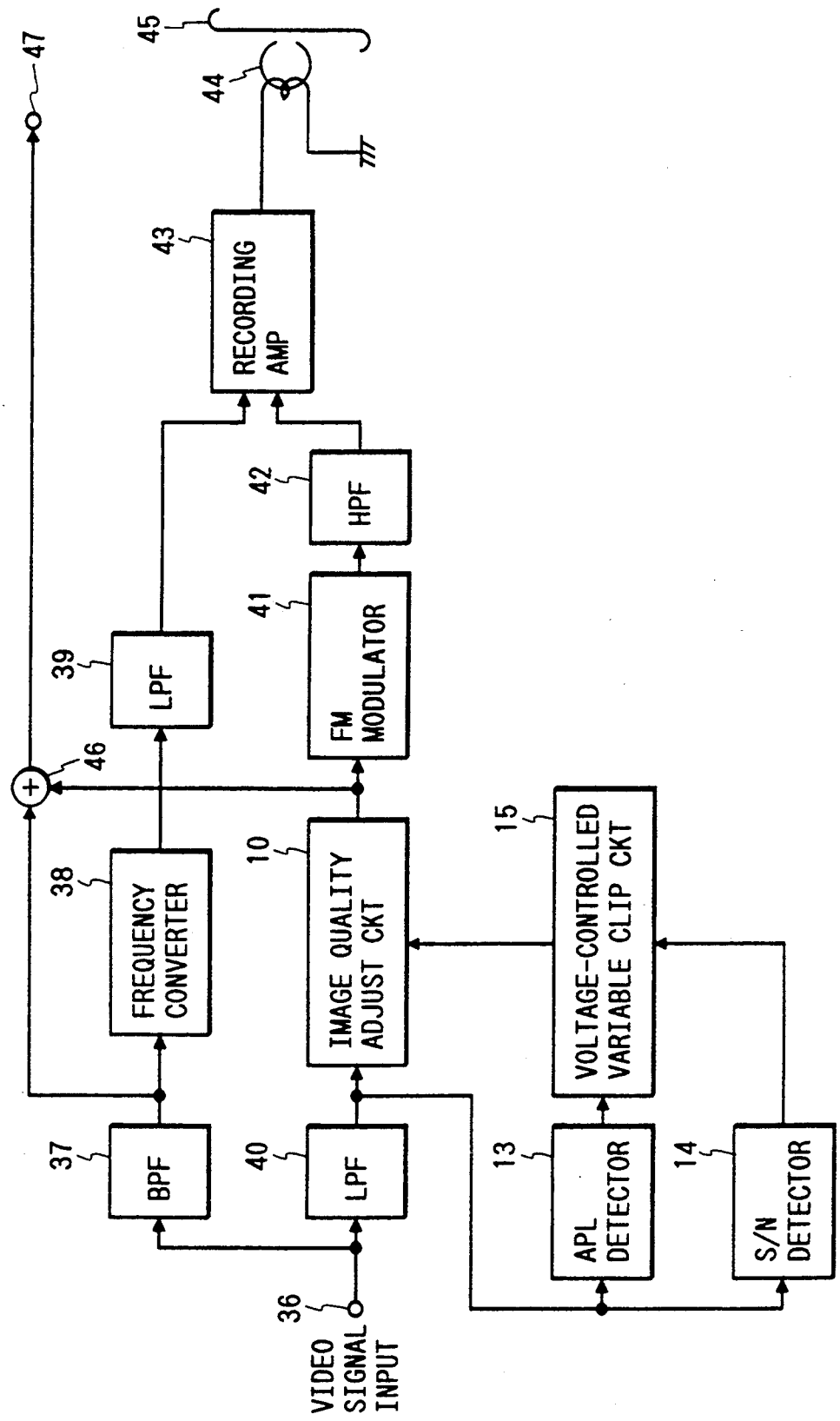
FIG. 13 is a block circuit diagram of a third embodiment of the present invention.
Figure 22:
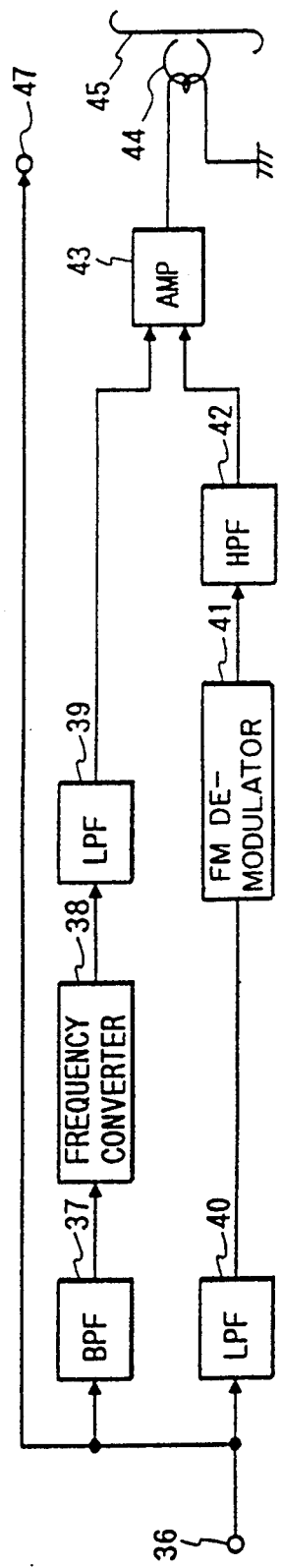
FIG. 22 is a block circuit diagram showing another conventional reproducing system of a home VTR.
Figure 23:
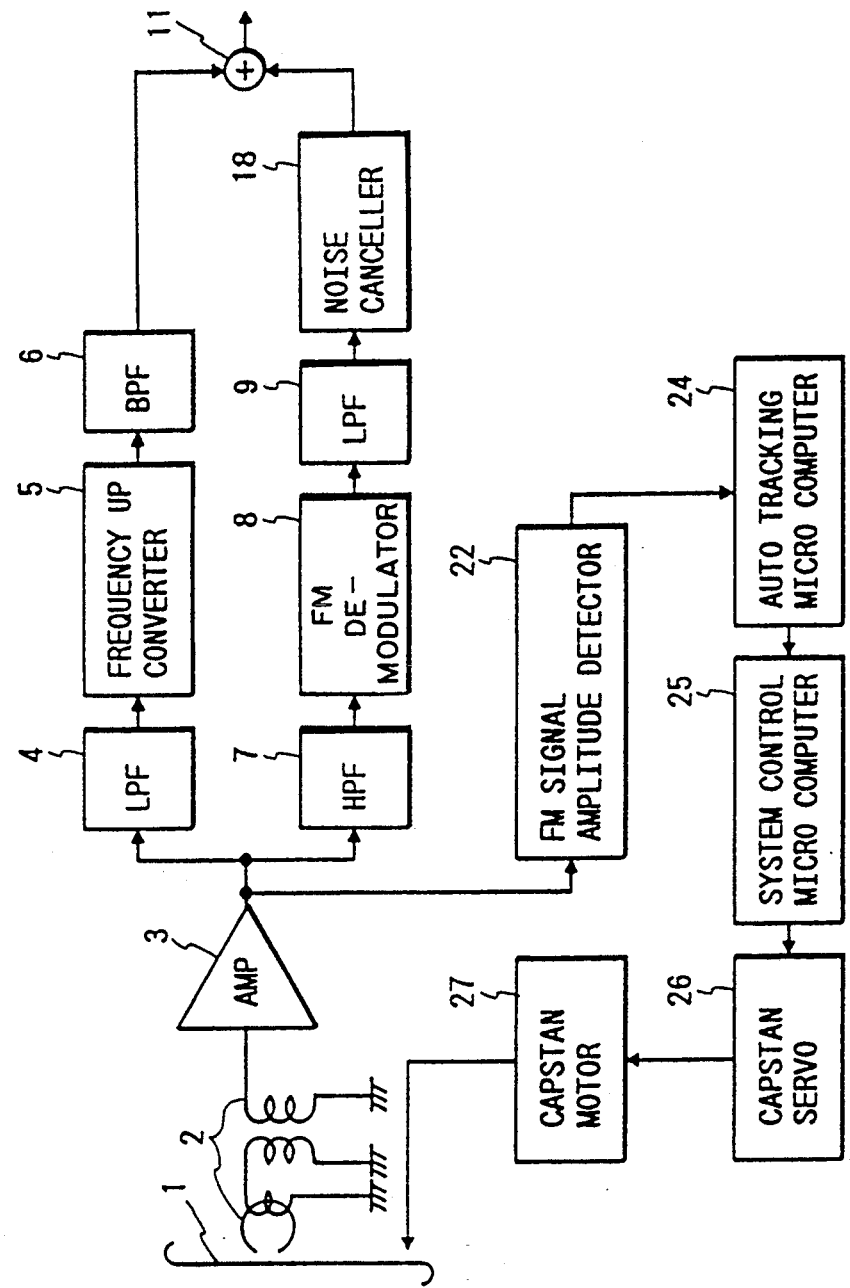
FIG. 23 is a block circuit diagram showing a further conventional reproducing system of a home VTR.
Figure 24:
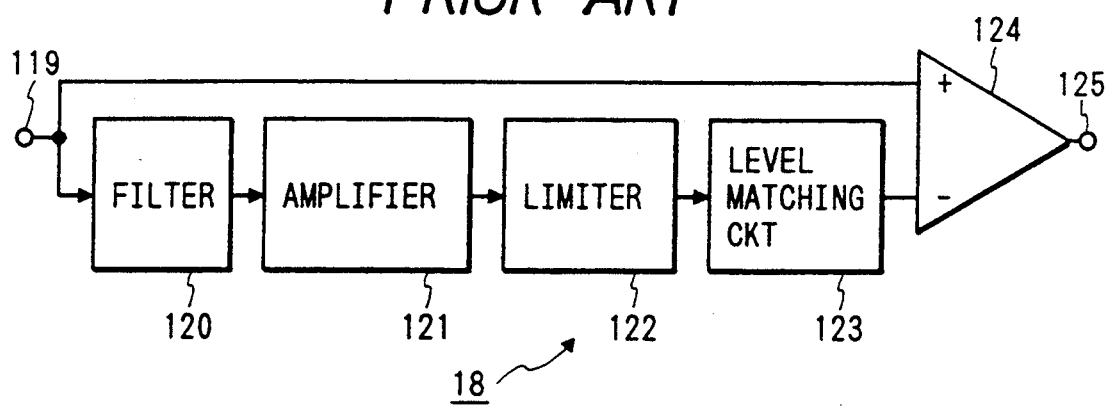
FIG. 24 is a block circuit diagram of a noise remover in FIG. 23.

FIG. 13 shows another embodiment of the present invention applied to a recording system of a home VTR having a tuning system. The embodiment shown in FIG. 13 is similar to the conventional system shown in FIG. 22 except that an image quality adjusting circuit 10 is inserted between the LPF 40 and the FM modulator 41, that the image quality adjusting circuit 10 is controlled by a combination of an APL detector 13, an S/N detector 14 and a voltage-controlled variable clip circuit 15 as in the embodiment shown in FIG. 1 and that outputs of the BPF 37 and the image quality adjusting circuit 10 are added and provided as an EE signal. Since all components of this embodiment except the above mentioned differences are the same as those shown in FIG. 22 and operations thereof are described already, details thereof are omitted. The video luminance signal from the LPF 40 is supplied to the image quality adjusting circuit 10, the APL detector 13 and the S/N detector 14. An output APL information from the APL detector 13 and the S/N information from the S/N detector 14 are supplied to the voltage-controlled variable clip circuit 15 and, after being suitably processed thereby, controls the image quality adjusting circuit 10. An output of the image quality adjusting circuit 10 is supplied to the FM modulator 41 and the adder 46. In the adder 46, the video luminance signal which is adjusted in image quality is added to a high frequency color signal from the BPF 37 and sent to the EE signal output 47. In this embodiment, the image quality adjustment is performed for both the recording signal and the EE signal.

Figure 14:
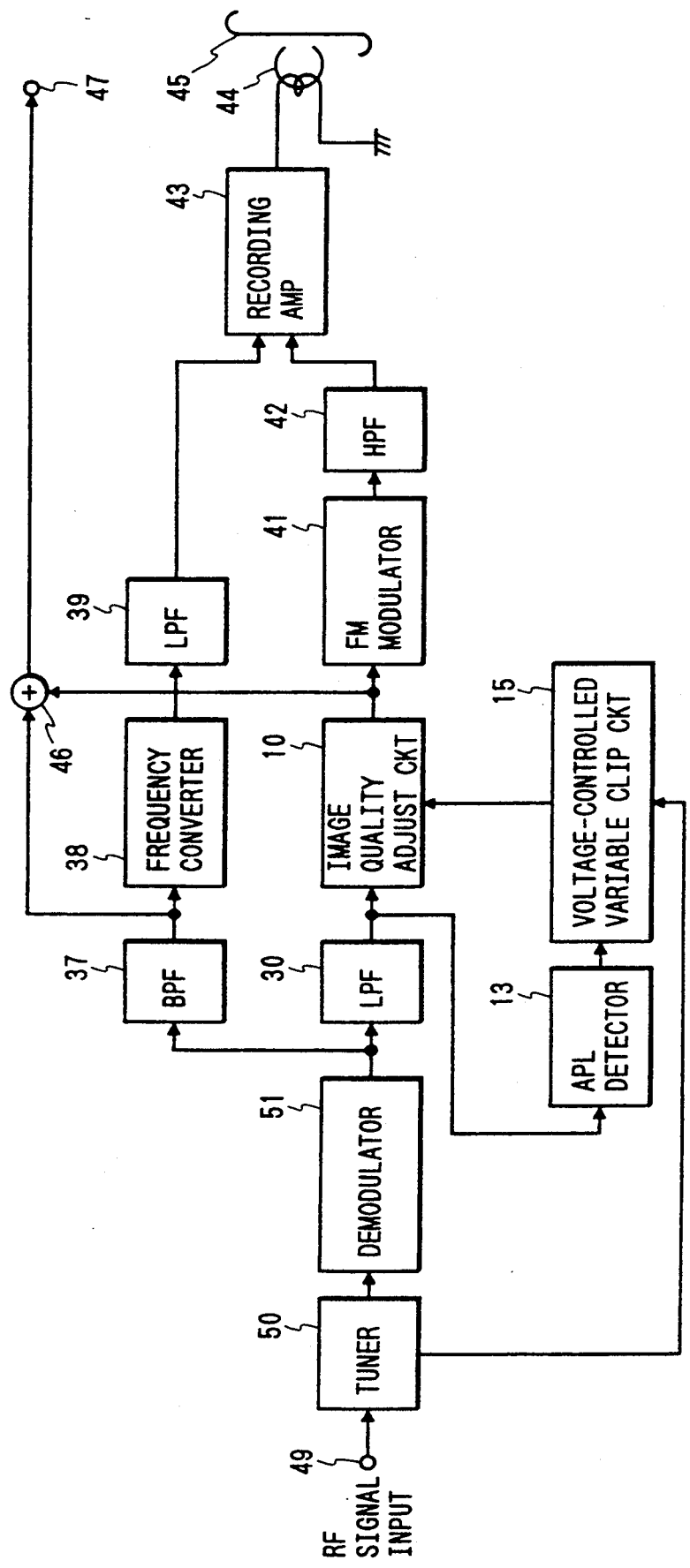
FIG. 14 is a block circuit diagram of a fourth embodiment of the present invention.

FIG. 14 shows another embodiment which differs from the embodiment in FIG. 13 in that the S/N detector 14 in FIG. 13 is substituted by a tuner 50 and a demodulator 51. A detail of the tuner 50 is shown in FIG. 14. In FIGS. 13 and 14, a RF signal supplied to a terminal 49 passes to the tuner 50 in which a signal transmitted through a desired channel is selected. The selected signal is supplied to the demodulator 51 and, after demodulated thereby, to a BPF 37 and a LPF 40, as in the case shown in FIG. 13.

Figure 15:
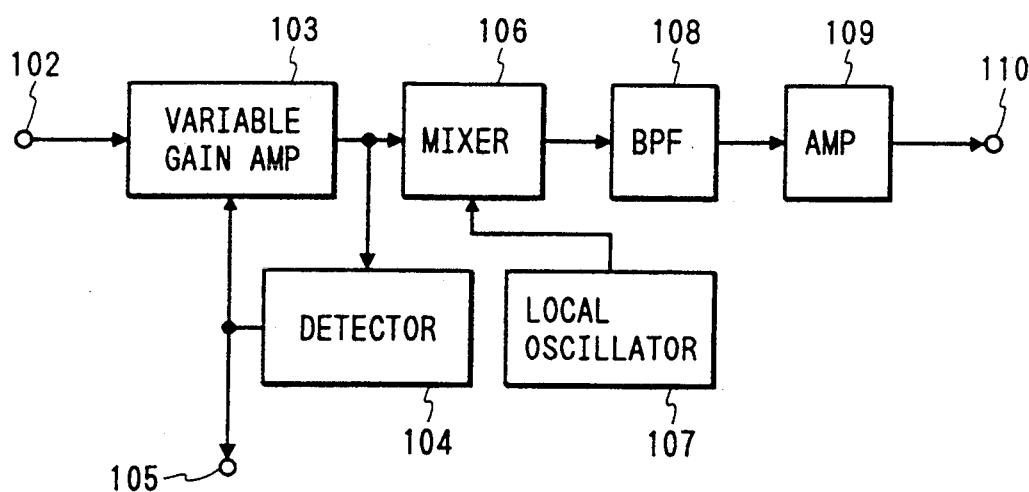
FIG. 15 is a block circuit diagram showing an example of a tuner in FIG. 14.

FIG. 15 shows an example of construction of the tuner 50. In FIG. 15, the tuner 50 comprises a variable gain amplifier 103 having an input 102 and a control terminal 105, a detector 104 having an input connected to an output of the variable gain amplifier 103 and an output connected to the control terminal 105, a mixer 106 having an input connected to the output of the variable gain amplifier 103 and a terminal connected to a local oscillator 107, a BPF 108 and an amplifier 109 having an output connected to an output terminal 110.

That is, the RF signal at the input 102 of the tuner 50 is amplitude-controlled by an automatic gain control circuit constituted with the variable gain amplifier 103 and the detector 104 and then mixed in the mixer 106 with a signal from the local oscillator 107. Thus, an output of the mixer 106 includes a frequency sum component and a frequency difference component of the two input signals. The frequency sum component thereof is removed by a BPF 108 and the remaining frequency difference component is amplified by the amplifier 109 and sent to the demodulator 51. The output of the detector 104 which is provided at the terminal 105 thereof as a detection potential controls the gain of the variable gain amplifier 103.

Figure 16:
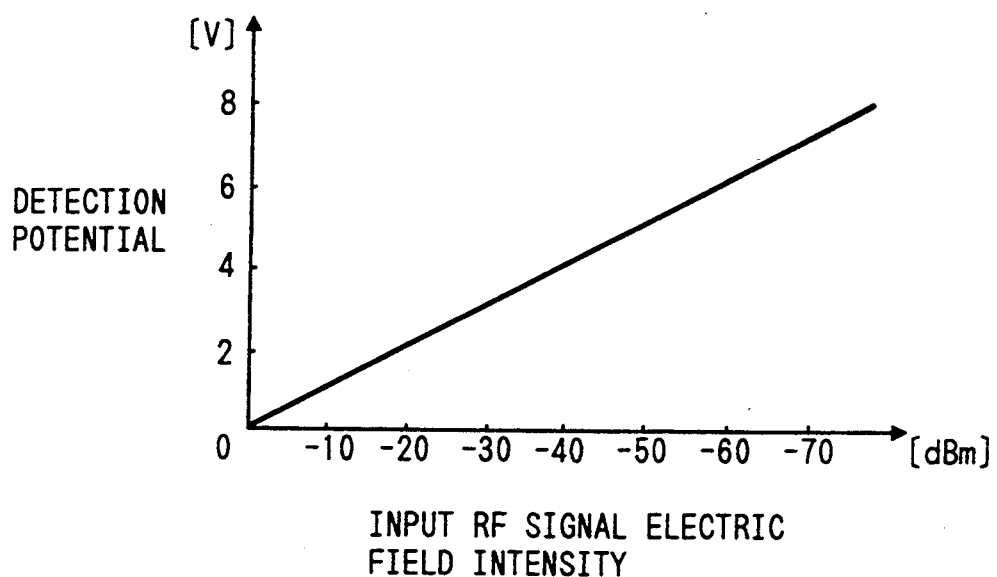
FIG. 16 is a graph showing characteristics of an automatic gain control circuit composed of a variable gain amplifier and a detector in FIG. 15.

FIG. 16 shows detection potential characteristics of the automatic gain control circuit constituted with the variable gain amplifier 103 and the detector 104. As shown in FIG. 16, the detection potential at the terminal 105 varies with electric field intensity of the input RF signal. That is, it contains an input RF signal electric field intensity information. When the field intensity is reduced and becomes lower than a certain level, the S/N of the video signal from the demodulator 51 becomes low. Therefore, in such case, the detection potential can be used as a substitution for the S/N information to be supplied to the control terminal of the voltage-controlled variable clip circuit 15.

Figure 17:
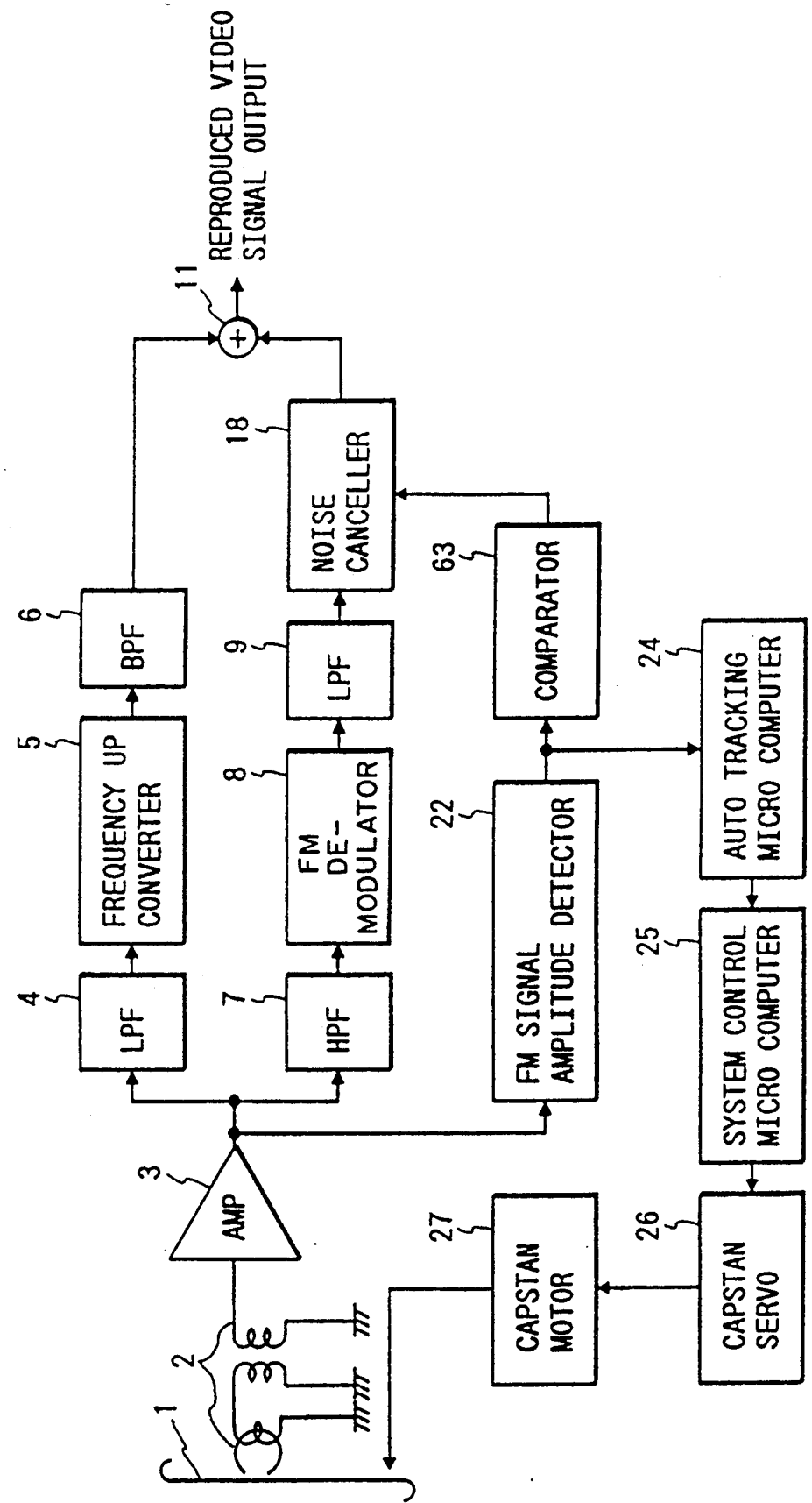
FIG. 17 is a block circuit diagram of a fifth embodiment of the present invention.

FIG. 17 shows another embodiment of the present invention which is similar to that shown in FIG. 10 except that the image quality adjusting circuit 10 is in the form of a noise canceller 18 and that the APL detector 13 and the voltage-controlled variable clip circuit 15 are substituted by a comparator 63. The FM signal amplitude detector 22 may be constructed as shown in FIG. 11.

Figure 18:
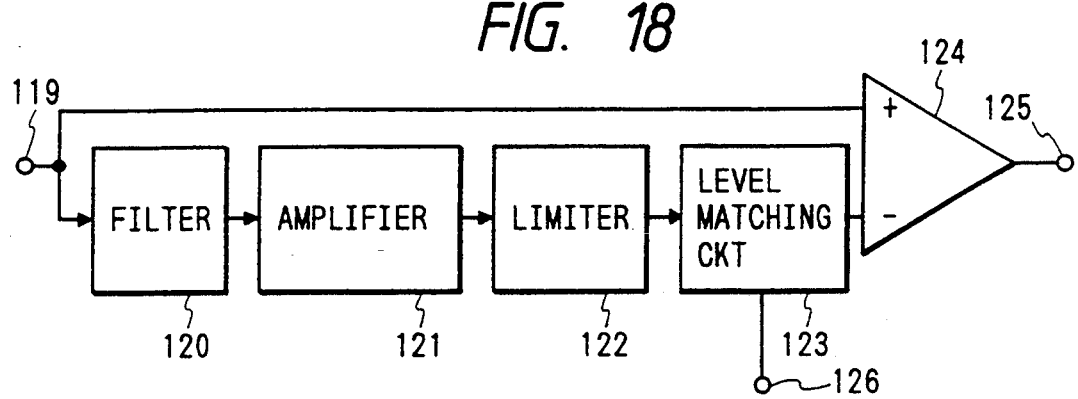
FIG. 18 is a block circuit diagram of a noise remover in FIG. 17.
Figure 19:
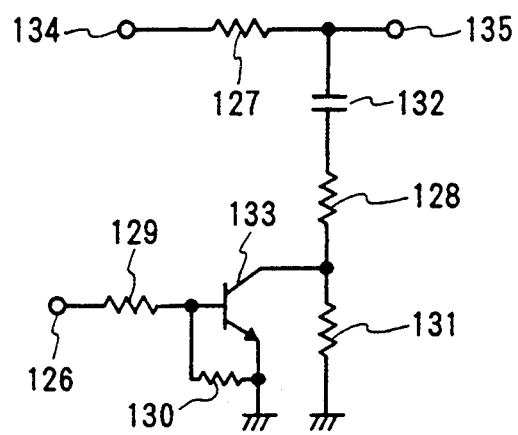
FIG. 19 is a circuit diagram of a level matching circuit in FIG. 18.
Figure 25:
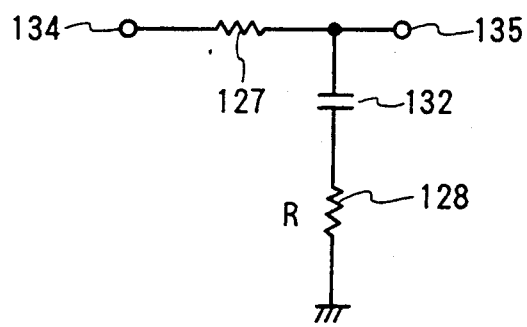
FIG. 25 is a circuit diagram of a level matching circuit in FIG. 24.

As shown in FIG. 18 which shows a construction of the noise canceller 18 in FIG. 17, the level matching circuit 123 includes a control terminal 126. Referring to FIG. 19 which shows the level matching circuit 123 in more detail, it includes, in addition to the circuit shown in FIG. 25, a resister 131 connected in series with the resister 128, a transistor 133 having a collector connected to a junction between the resisters 128 and 131, an emitter grounded and a base connected through a resister 129 to the control terminal 126 and a collector-base resister 130. To the control terminal 126, a DC potential at the output terminal of the comparator 63 is supplied, by which the transister 133 is on/off controlled so that the attenuation resister value can be switched between that of the resister 128 and a sum of the resisters 128 and 131.

Referring to FIG. 12, an output DC potential is proportional to an input FM signal amplitude as mentioned previously. At this time, it is assumed that a threshold value defining S/N ratio is set visually empirically to 350 mVp-p. That is, when the FM signal amplitude is not less than 350 mVp-p, an image obtainable is acceptable, otherwise, not acceptable. Since, when the input of the FM signal amplitude detector 22 is 350 mVpp, the output DC potential is 2.5 V, the noise cancellar may be switched in its characteristics at the DC potential of 2.5 V.

Figure 20:
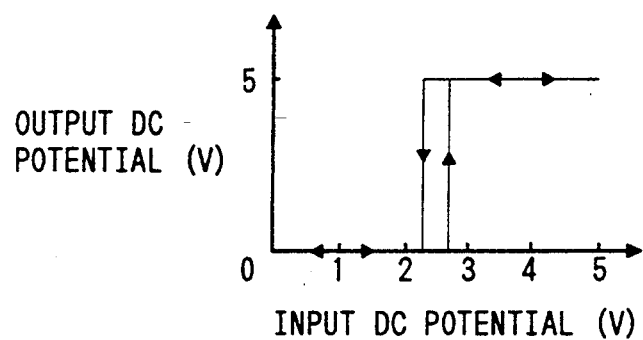
FIG. 20 is a graph showing characteristics of a comparator in FIG. 17.

FIG. 20 shows a characteristics of the comparator 63. The comparator 63 has a hysteresis characteristics and, when the input DC potential is higher than 2.7 V, the output DC potential becomes high level (5 V) and, when it is lower than 2.3 V, the output DC potential becomes low level (0 V). With such hysteresis characteristics of the comparator 63, there is no frequent undesired switching of the characteristics thereof which may be due to turburence and make a displayed image uncomfortable, even when the output DC potential around the FM signal amplitude of 350 mVp-p. Thus, the DC potential supplied to the control terminal 126 of the level matching circuit 123 of the noise canceller 18 is high level (5 V) when the S/N value of the reproduced video signal and it becomes low level (0 V) when the S/N ratio is bad. Therefore, when there is no noise of the reproduced image, the transister 133 of the level matching circuit 123 is turned on, so that the resistance value R becomes R1 which is determined by only the value of the attenuation resister 128 and, when noise component of the reproduced image is large, the transister 133 is turned off causing the attenuation value R to be a sum R2 of the resistors 128 and 131.

Figure 26:
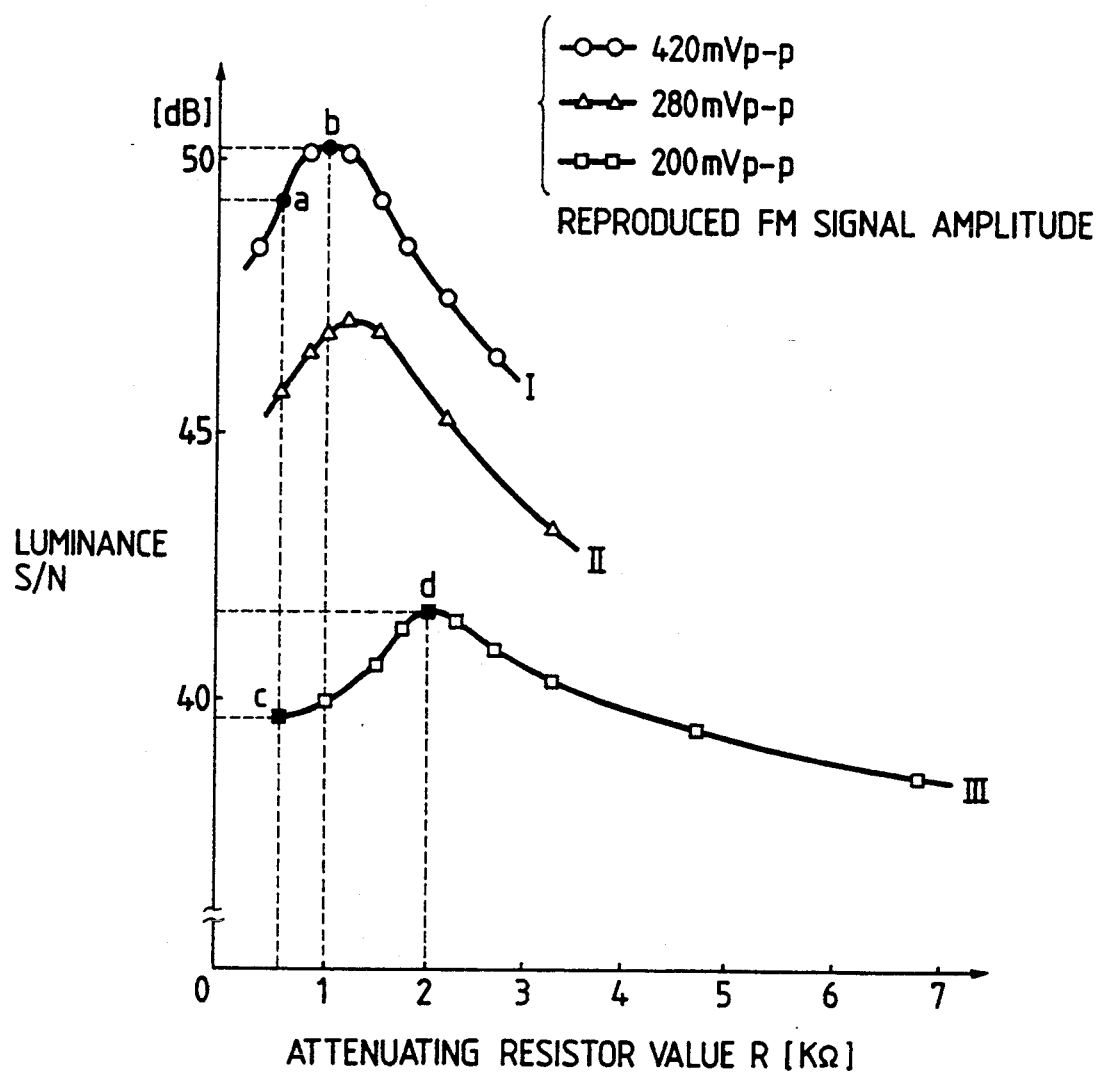
FIG. 26 is a graph showing characteristics of the level matching circuit in FIG. 25.

For example, when the value R1 and the value R2 are set to values corresponding to the point a on the characteristics curve I in FIG. 26 and the point d on the characteristics curve III, respectively, the system operates at the point a suitable in reproducibility of minute signal when the noise is small and at the point d suitable in S/N ratio when noise is considerable, resulting in a good image in either case. By providing a plurality of switching points of the characteristics of the noise canceller, it is possible to realize a more up-to-date control for various noise conditions. Further, when the R1 and R2 are set to values corresponding to the point b on the characteristic curve II and the point d on the curve III, an image can be obtained with the S/N ratio being considered first.

Although the present invention has been described with reference to specific embodiments, the present invention may be embodied in other specific forms without departing from the spirit or essential characteristics thereof. Therefore, the present embodiments are to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A video signal processor comprising:
   a noise canceling circuit including an amplitude limiter circuit; and,
   state switching means;
   wherein said noise canceling circuit is constructed such that a noise component derived from a video signal after being passed through said limiter is amplified or attenuated and then subtracted from the video signal, and wherein said state switching means is operable to switch said noise canceling circuit between a first state in which an amplification or attenuation thereof is set such that an amplitude of a noise component derived after being passed through said limiter circuit substantially equals an amplitude of a noise component contained in the video signal and subtracting the noise component from the video signal under a first condition where the noise component of the video signal is small enough to not be influenced by an amplitude limiting effect of said limiter circuit or in a second state in which the amplification of the noise component is increased or the attenuation of the noise component is decreased compared with the first state to compensate for an amplitude attenuation of the noise component limited by said limiter circuit under a second condition where the amplitude of the noise component of the video signal is large enough to be influenced by the amplitude limiting effect of said limiter circuit.

2. The processor of claim 1, further comprising means for detecting an amount of noise of the video signal, wherein said state switching means includes means for switching said noise canceling circuit between the first and second states automatically on the basis of the amount of noise detected by said means for detecting noise.

* * * * *